United States Patent
Neavin

(10) Patent No.: US 9,805,258 B2
(45) Date of Patent: Oct. 31, 2017

(54) SYSTEMS AND METHODS FOR SEPARATING DOCUMENTS

(71) Applicant: Lexmark International Technology Sarl, Genève (CH)

(72) Inventor: Jason Michael Neavin, Anna, TX (US)

(73) Assignee: KOFAX INTERNATIONAL SWITZERLAND SARL, Geneva (CH)

( * ) Notice: Subject to any disclaimer, the term of this patent is extended or adjusted under 35 U.S.C. 154(b) by 115 days.

(21) Appl. No.: 14/587,529

(22) Filed: Dec. 31, 2014

(65) Prior Publication Data

US 2016/0055375 A1 Feb. 25, 2016

Related U.S. Application Data

(60) Provisional application No. 62/040,187, filed on Aug. 21, 2014.

(51) Int. Cl.
*G06K 9/00* (2006.01)
*H04N 1/00* (2006.01)

(52) U.S. Cl.
CPC ..... *G06K 9/00456* (2013.01); *G06K 9/00469* (2013.01); *G06K 9/00483* (2013.01); *H04N 1/00* (2013.01)

(58) Field of Classification Search
None
See application file for complete search history.

(56) References Cited

U.S. PATENT DOCUMENTS

| | | | | |
|---|---|---|---|---|
| 5,608,819 A * | 3/1997 | Ikeuchi | ........... | G06K 9/00456 358/462 |
| 7,529,408 B2 * | 5/2009 | Vohariwatt | ........ | G06K 9/00469 382/180 |
| 8,392,816 B2 * | 3/2013 | Radakovic | ........ | G06K 9/00469 715/200 |
| 8,520,941 B2 * | 8/2013 | Nafarieh | ........... | G06K 9/00456 382/164 |
| 8,675,260 B2 * | 3/2014 | Uchida | ............ | G06K 9/00442 358/1.18 |
| 8,892,562 B2 * | 11/2014 | Renders | ........... | G06F 17/30256 707/740 |
| 9,626,555 B2 * | 4/2017 | Smirnov | ........... | G06K 9/00456 |

(Continued)

OTHER PUBLICATIONS

Shin, Christian, David Doermann, and Azriel Rosenfeld. "Classification of document pages using structure-based features." International Journal on Document Analysis and Recognition 3.4 (2001): 232-247. APA.*

(Continued)

*Primary Examiner* — Michelle Hausmann
*Assistant Examiner* — Michelle Entezari
(74) *Attorney, Agent, or Firm* — Zilka-Kotab, P.C.

(57) ABSTRACT

A method of automatically separating a stack of pages into documents includes receiving a plurality of page images from a scanner; extracting content from each of the plurality of page images; for each of the plurality of page images, determining, based upon the extracted content, whether the page image is an initial page image of a document; and appending each of the plurality of page images located between a first determined initial page image and a second determined initial page image to the first determined initial page image.

18 Claims, 5 Drawing Sheets

(56) References Cited

U.S. PATENT DOCUMENTS

| | | | | |
|---|---|---|---|---|
| 2008/0147790 | A1* | 6/2008 | Malaney | G06Q 10/00 |
| | | | | 709/203 |
| 2009/0063189 | A1* | 3/2009 | Hupke | G06F 19/363 |
| | | | | 382/209 |
| 2010/0217595 | A1* | 8/2010 | Kim | G10L 17/26 |
| | | | | 704/250 |
| 2012/0162730 | A1* | 6/2012 | Nagai | H04N 1/40062 |
| | | | | 358/530 |
| 2014/0032558 | A1* | 1/2014 | Renders | G06F 17/30256 |
| | | | | 707/740 |
| 2015/0046488 | A1* | 2/2015 | Liao | G06F 17/30268 |
| | | | | 707/769 |

OTHER PUBLICATIONS

Wang, Jiajun, et al. "Page segmentation and classification based on pattern-list analysis." Intelligent Multimedia, Video and Speech Processing, 2004. Proceedings of 2004 International Symposium on. IEEE, 2004.*

Etemad, Kamran, Rama Chellappa, and David Doermann. "Document page segmentation by integrating distributed soft decisions." Neural Networks, 1994. IEEE World Congress on Computational Intelligence., 1994 IEEE International Conference on. vol. 6. IEEE, 1994.*

* cited by examiner

SYSTEMS AND METHODS FOR SEPARATING DOCUMENTS

CROSS REFERENCE TO RELATED APPLICATIONS

Pursuant to 35 U.S.C. §119, this application is related to and claims the benefit of the earlier filing date of provisional application Ser. No. 62/040,187, filed Aug. 21, 2014, entitled "Systems and Methods for Separating Documents," the contents of which is hereby incorporated by reference herein in their entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure relates to processing scanned images on an imaging device and, more particularly, it relates to systems and methods for automatically separating documents.

2. Description of the Related Art

In the course of doing business in various industries, information and data from customers or clients may be needed. Typically, such information is captured using forms filled out electronically or by hand. In order to verify the completeness and/or accuracy of the information, or to obtain the customer's signature, completed forms are often printed and then presented to the customer. Subsequently, such forms are often stored transmitted electronically, such as to a server for further processing and/or to a database for storage.

One industry that uses a multitude of documents or forms is the finance industry. For example, when a person or company opens a bank account at a financial institution, an application form, a signature specimen card, a waiver of liability and a taxpayer identification form, among others, may need to be completed. Upon verification that the forms are accurate and complete, the financial institution uses a scanner or scanning system to scan the hard copy of the documents and retain electronic copies of the forms in at least one electronic content management system and/or other storage repository. The scanning may take place while the customer is waiting, or the documents may be set aside and scanned to the electronic content management system at a later time. The electronic copies may be organized in any number of ways. For example, the electronic copies may be stored by customer or by form type.

To make the scanning and organization process more efficient, some businesses utilize separator sheets between the documents. However, the placement of the separator sheets is a manual human process and may be time consuming. Additionally, errors may occur. For example, the person scanning the forms may rely on the person inserting the separator sheets as having grouped all of the pages of the form correctly and not verify the accuracy of the groupings prior to scanning the forms. Thus, when the documents are scanned, one document may be missing a last page while another document may have an extra page, and errors may not be immediately detected after scanning.

Another potential error that may occur with the use of separator sheets is that the person scanning the form may accidentally send a document to an incorrect process workflow or repository. Regardless of when an error is detected, the error would need correcting, and if the error requires a re-scan of the documents, it may be more difficult to locate the hard copies of the documents, especially as more time elapses between the scanning of the document and the detection of the error.

Accordingly, a need exists for a system which allows for the scanning of multiple documents without using separator sheets. What is also needed is a method to categorize, group and/or sort scanned pages into the appropriate electronic document and automatically route the documents to the appropriate process flow or repository. Additional benefits and alternatives are also sought when devising solutions.

SUMMARY

Systems and methods for automatically appending scanned pages into separate documents are disclosed.

In one example embodiment, a method of processing a plurality of page images includes receiving the plurality of page images from a scanner, the plurality of page images belonging to a plurality of documents; extracting content from each of the plurality of page images; for each of the plurality of page images, determining, based upon the extracted content, whether the page image is an initial page image of a document in the plurality of documents; and appending each of the plurality of page images located between a first determined initial page image and a second determined initial page image to the first determined initial page image.

In another example embodiment, a scanned page classified as a first page is bookmarked. The system then proceeds to classify the succeeding pages until another first page is found. The system then bookmarks the second first page, automatically appends all pages preceding the second bookmarked page to the first bookmarked page and creates an electronic document comprising the first bookmarked page and all appended pages.

In still other example embodiments, the system moves the bookmark from the first identified first page to the second identified first page and then creates an electronic document comprising of all scanned pages preceding the bookmarked page.

In yet other example embodiments, the classification of pages may be include classifying the scanned pages into document types.

In some example embodiments, the example methods of processing or classifying may be performed in an imaging device. In other example embodiments, some or all actions of the example methods may be performed remote to an imaging device. In some example aspects, multiple applications may be employed to perform the processing or classifying.

In some example embodiments, the example system may execute the example methods after each page is scanned. In alternate example embodiments, the example system may execute the example method after some or all of the pages in a stack of documents have been scanned.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
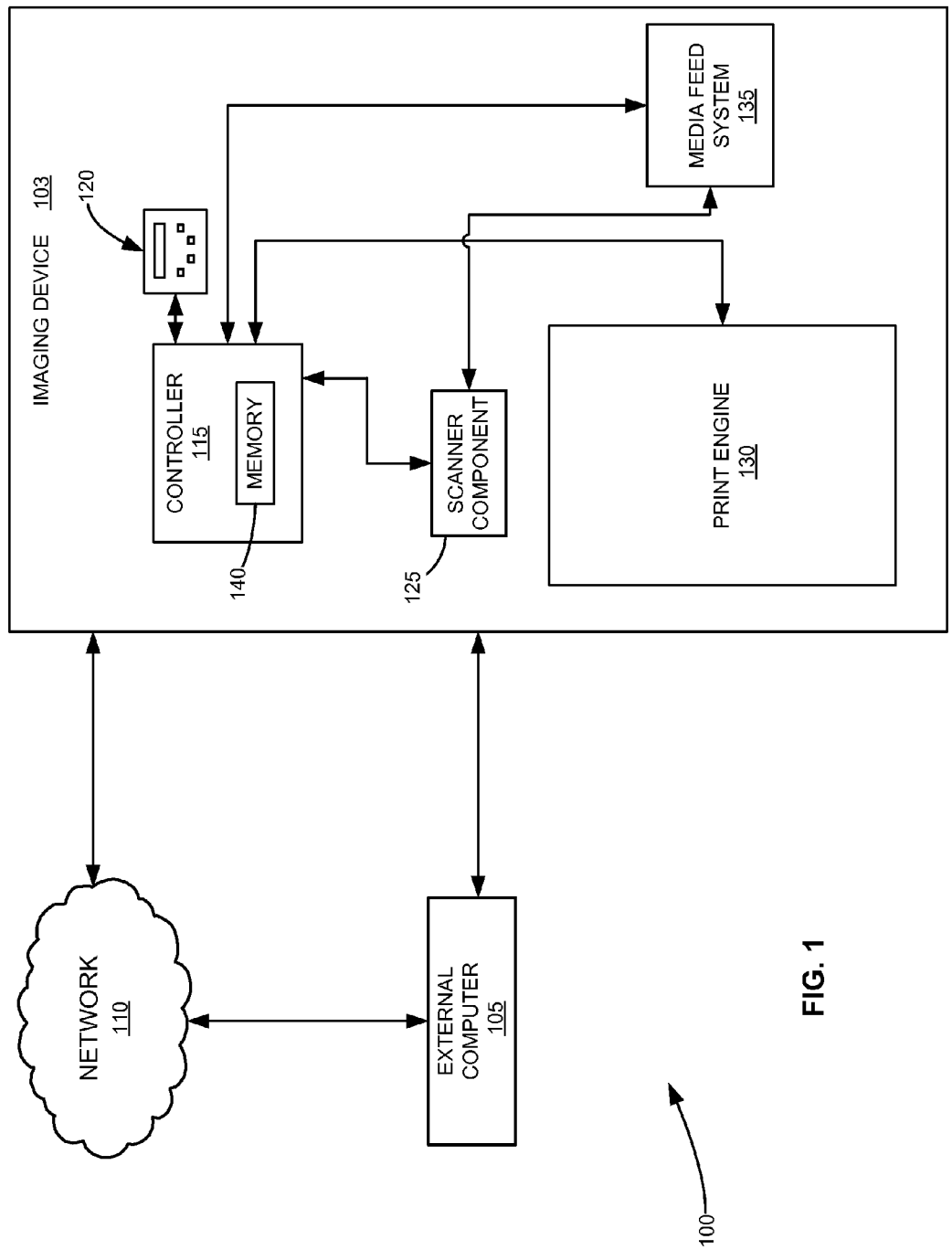
FIG. 1 is a block diagram illustrating one example system for scanning multiple documents.

The following description and drawings illustrate embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some example embodiments may be included in or substituted for those of others. The scope of the present application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the example flowcharts or diagrams, and combinations of blocks in the example flowcharts or diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable memory produce an article of manufacture, including an instruction means that implements the function specified in the block or blocks. The computer program instructions may also be loaded onto a computer or other programmable data processing apparatus to cause a series of operational actions or steps to be performed on the computer or other programmable apparatus to produce a computer implemented process such that the instructions that execute on the computer or other programmable apparatus implement the functions specified in the block or blocks.

Accordingly, blocks of the example flowcharts and diagrams support combinations of means for performing the specified functions, combinations of actions or steps for performing the specified functions and program instruction means for performing the specified functions. It will also be understood that each block of the diagrams, and combinations of blocks in the diagrams, may be implemented by special purpose hardware-based computer systems or combinations of special purpose hardware and computer instructions that perform the specified functions, actions or steps.

Disclosed are systems and methods for automatically identifying one or more pages of a document and grouping the scanned pages into their respective documents. One example method includes receiving, from an imaging device, a plurality of scanned pages; identifying at least one first page from the plurality of scanned pages; appending scanned pages between two identified first pages to a preceding first page; and creating an electronic file including the identified first page and the appended pages.

For purposes of the present disclosure, it will be appreciated that a document may be a single page or a multiple or collection of pages containing connected or otherwise related information. Single page documents would be printed on only one side of a media sheet, but a multi-page document may be printed may be printed on only one side of the media sheet or on both sides of a media sheet. Documents may contain only text, only images or both text and images. Documents may be printed in black and white or color. A group of documents may be referred to as a stack of documents, or simply, a stack. The number of pages per document may vary, depending on the document type. For example, a document may be a single page signature card, a two-page application form or a twenty page contract.

A document may be of one of a number of types. The document type defines what information a document contains and may also define the layout of the information printed on the document. Examples of document types may include, but are not limited to, application forms, contracts, waivers, business proposals, and signature specimen cards.

Scanning the media sheet pages produces an electronic page image that may be modified for any number of purposes, for example, sending via email and printing.

Arrangement of the pages of a document refers to the sequence of pages in the document. The placement of a page refers to its position within the sequence of pages. The arrangement and placement of pages logically follows the flow of information contained therein. For example, if the arrangement of the pages is Page 1, Page 2 and Page 3, the placement of Page 2 is second. Page 2 should precede Page 1 since the information contained in Page 2 may be a continuation of the information contained in Page 1.

A page may have a classification that identifies which document in the stack it belongs to, as well as its placement within that document. This classification may be based on one or more indicators such as, for example, on the textual information contained on the page, the layout of the page, or a combination of both the information and layout. For example, the first page of an application form would most likely have words such as "Application", "Name", and "Address", as well as a number of blank spaces. In some example embodiments, the indicator may be contained in a barcode on the page. A computer program or application may be taught to recognize such indicators and make the appropriate determination using techniques and methods known to those skilled in the art.

FIG. 1 shows one example system 100 for scanning multiple documents. System 100 includes an imaging device 103, a computer 105 and a network 110 that communicatively connects imaging device 103 and computer 105. In other example embodiments, imaging device 103 may be web-enabled and may communicate with computer 105 via a wired or wireless connection to network 110. In yet other example embodiments, imaging device 103 may be locally connected to computer 105 and in a non-networked manner.

Imaging device 103 may be any device capable of printing or producing a hard copy of a data file or document stored in electronic form. For example, imaging device 103 may be a laser, inkjet or dot matrix printer or multi-function printing device that has the capability of performing other functions, such as faxing, e-mailing, scanning and/or copying, in addition to printing. In some example embodiments, imaging device 103 may further include at least one computer-readable storage medium having stored thereon one or more modules or applications, such as a search module, an optical character recognition (OCR) application and/or an optical mark recognition (OMR) application.

Imaging device 103 may include a controller 115, a user interface 120, a scanner component or system 125, a print engine 130, and a media feed component or system 135. User interface 120 is communicatively connected to controller 115. Controller 115 may include a processor unit (not shown) and associated memory 140 and may be implemented as one or more Application Specific Integrated Circuits (ASICs). Memory 115 may be any volatile and/or non-volatile memory. Controller 115 may be, for example, a controller for controlling printing, scanning and other functions of imaging device 103. Controller 115 serves to process print data, such as operating print engine 130 during printing, operating scanner component 125 and process data obtained therefrom. In some example embodiments, user interface 120 of imaging device 103 may be a graphical user interface, a monitor, a series of buttons, a touch-sensitive display panel, a voice-activated interface, a speaker or the like. In yet other example embodiments, the user interface may also serve as an input device for imaging device 103. In some example embodiments, user interface 120 may be attached as a separate component and communicatively coupled to imaging device 103.

Media feed system 135 may be controlled by controller 115 and utilized for feeding sheets of media to scanner system 125. In some embodiments, media feed system 135 may be an automatic document feeder (ADF).

Scanner component 125 of imaging device 103 performs scanning and may be utilized in other operations associated with a multi-function device, such as copying and send-to-email operations. In some other example embodiments, scanner component 125 may be an external standalone scanning device communicatively connected to imaging device 103 and/or computer 105 via network 110.

Computer 105 may be a personal computer, a network PC, a tablet, or a mobile device. Computer 105 may be communicatively coupled to one or more user input devices (not shown), such as a keyboard or mouse and a display monitor (not shown). In some example aspects, display monitor may include the functionality of user input devices, such as in a touch screen display, thereby eliminating the need for separate user input devices. Computer 105 may contain an application or instructions for automatically identifying pages of a document and classifying or grouping the scanned pages of a stack into their respective documents.

Imaging device 103 may be connected to a network 110 via one or more appropriate communication links (not shown), as will be understood by those of ordinary skill in the art. Network 110 may be any communications network such as, but not limited to, a peer-to-peer network, a hybrid peer-to-peer network, a LAN, a WAN or a cellular network. Network 110 may be a public network, such as the Internet, or a private network.

Imaging device 103 may operate in a networked environment using logical connections to one or more other computing configurations, such as computer 105. For example, the one or more communication links may be established by a direct cable or optical connection, by a wireless connection, and/or by a network connection such as, for example, an Ethernet local area network (LAN) or wide area network (WAN).

Figure 2:
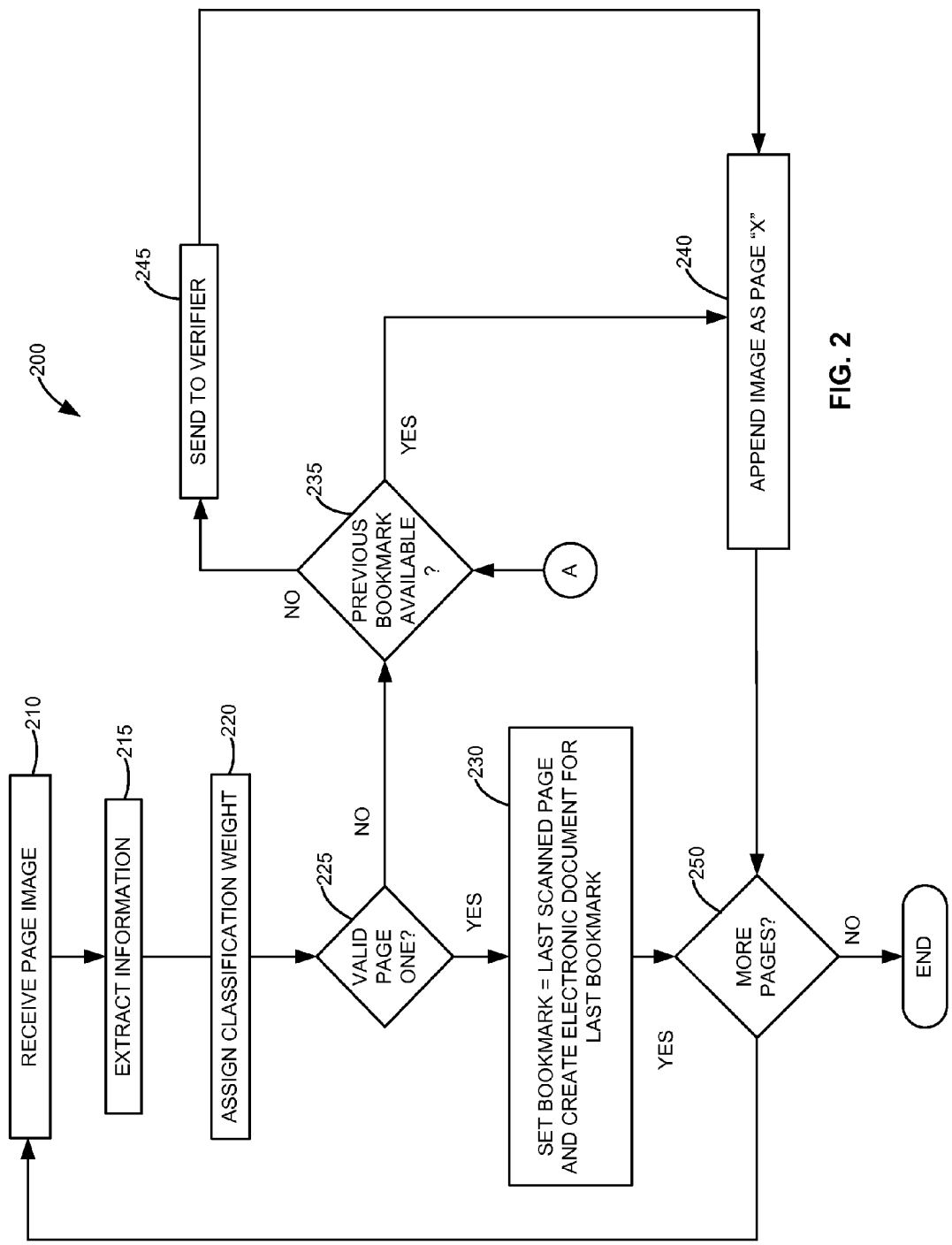
FIG. 2 shows one example method of classifying scanned images and automatically appending the classified page images to an appropriate document.

FIG. 2 shows one example method 200 of classifying scanned pages or images and automatically appending the classified page images to an appropriate document. At block 210, a page image from a scan job may be received by imaging device 103. The page image may be part of a stack of documents such as, for example, a stack of assorted banking and financial forms filled out or completed by a customer and/or banking representative. The scanning may be done manually on a page by page basis or automatically via media feed system 135.

At block 215, information may be extracted from the received page image. The extraction may be accomplished by any number of methods known in the art, such as OCR or OMR. For example, in the case of completed banking forms, the extracted information may include client details such as names, addresses, and other contact information. The information extracted may be used in and for one or more processes, such as classifying the page image, identifying or categorizing the document, or storing the document in a database.

At block 220, a classification weight may be assigned to the received page image. The classification weight is a value assigned to a page image based on the information extracted at block 215. The classification weight may be based upon the likelihood or probability that the received page image is a first page of a document and calculated based upon the extracted information, the layout and/or the phrasing of the extracted information. The classification weight assigned to a page allows system 100 to determine the document to which the page belongs. The classification weights may be defined by the application performing example method 200 or another assigning application communicatively connected to the application performing example method 200.

To define the classification weights, the application assigning the classification weight may process a small sample set at initial startup of the application performing example method 200, and based on the information and the layout and phrasing of the page images in the sample set, "learn" and assign classifications to the various documents that imaging device 103 may process in the future. The sample set may include some or all possible documents that imaging device 103 may process.

For example, during initial startup of the application performing example method 200, a user may provide page images of different document types. Based on the layout and phrasing of each page image, the application may determine classification weights for each. For example, the application may assign a classification weight of 60 to the page image corresponding to a first page of an application form. Then, during normal operation, when the application is performing example method 200, the defined classification weights in the sample set will be the classification basis for the page images being processed, as will be discussed in greater detail below.

Table 1 shows examples of classification weights that may be assigned to document pages during initial startup. In some example embodiments, the assigned classification weights at initial startup for the pages of each document may fall within a specific range. For example, pages for an application form may fall within a range of 50 to 60. In Table 1, the first page of an application form is assigned a classification weight of 60, and the second page is assigned a classification weight of 55. During normal operation, all page images assigned a classification weight within the range of 50 to 60 would then be compared to the classification weights of the pages of an application form. This may shorten the comparison process as it may decrease the number of possible candidates. In other example embodiments, the classification weights may be assigned in decreasing values within a range, with the first page of the document being assigned the highest value. For example, as shown in Table 1, the first pages of the Application form, the Signature Specimen and the Waiver are assigned the highest classification weights. In yet other example embodiments, the classification weights may be assigned randomly.

TABLE 1

Example Classification Weights for Document Pages

| Document Type | Classification Weight | | |
|---|---|---|---|
| | Page 1 | Page 2 | Page 3 |
| Application Form | 60 | 55 | — |
| Signature Specimen | 70 | 68 | 62 |
| Waiver | 92 | 88 | 73 |

At block 225, the likelihood of the page image being a first page may be determined. The determination may be done by comparing the classification weight assigned at block 220 with the classification weights of the sample set provided. In the event that there is no exact match, the distance between candidate document types may be determined, and the page image may be classified as the document type to which the assigned classification weight is closest. An example formula for determining the likelihood, in percentage, of a page image being a first page of a document type X is given below.

$$\text{Likelihood} = (1 - ((W_{type\ X} - W_{Assigned})/W_{type\ X})) * 100$$

wherein $W_{type\ X}$ is the classification weight of a page of candidate document type X, and $W_{Assigned}$ is the classification weight assigned to the page image.

The example formula above may be applied to received page images using classification weights of the pages of all document types from the sample set. In some example embodiments, the formula may be applied in a two-step process: first, applying the classification weight to determine the document type and second, applying the classification weight again in order to determine whether or not the page image is a first page of the determined document type.

For example, for a page image assigned a classification weight of 59, the formula above may be applied to come up with data shown below.

TABLE 2

Distance of Page Image from Candidate Document Type

| Document Type | Likelihood (%) | | |
|---|---|---|---|
| | Page 1 | Page 2 | Page 3 |
| Application Form | 98.3333 | 96.6667 | — |
| Signature Specimen | 84.2857 | 86.7647 | 95.1613 |
| Waiver | 64.1304 | 67.0455 | 80.8219 |

Table 2 shows the likelihood of a page image with a classification weight of 59 being a certain page of a document type. A page image is classified as the document type whose classification weight is closest to the classification weight of the page image. From Table 2, it can be determined that there is a 98.33% likelihood that the page image being classified is a first page of an Application Form, which means that the classification weight of the page image is 98.33% close to the classification weight of a first page of an Application Form. The page image in this example is therefore classified as a first page of an Application Form.

If it can be determined that the page image is a page one or first page of a document, the page image is assigned as a bookmark at block 230. Additionally, if a bookmark already exists, an electronic document is created. The electronic document includes the page image previously used as a bookmark as well as all page images subsequently appended to it. The format of the electronic document may be preset or predefined, by the manufacturer of the application, an administrator of system 100 or by a user. In some alternate embodiments, the format of the electronic document may be selected during initial startup or as each electronic document is created.

At block 235, if the page image is not a first page, it is determined if a bookmark is already exists. The presence of a bookmark means a first page of a document has been previously identified, and the page image is a subsequent page in subsequent document.

If a bookmark already exists, the page image is appended to the bookmark at block 240. The page image may also be identified as the next sequential page, such as "Page x", where x is a number in any format representing the location of the page in relation to the bookmark. For example, a page image immediately following a valid page one may be labeled Page 2, and a page image immediately following a page image labeled Page 2 may be labeled Page 3.

If no bookmark exists, no first page has been previously identified and, therefore, there is no first page to which to append the page image. In such case, the page image is sent to a verifier at block 245, which will identify, select and/or determine the proper classification of or the placement for the page image within the stack. For example, if the second page of a document is mistakenly scanned before the first page, there would be no existing bookmarked page to which to append the second page. In such a case, the second page is sent to the verifier which may determine whether the page is a subsequent page and append the subsequent page to the appropriate first page. In some example embodiments, the verifier may be another application that determines the placement of the scanned page within the stack. In other example embodiments, the verifier may be a user who manually determines the placement of the scanned page by viewing the page image on user interface 120 of imaging device 103 or a display monitor of computer 105.

At block 250, after the page image has been set as a bookmark, appended to an existing bookmark, or sent to the verifier, the application determines if there are still pages that need to be scanned and classified. If additional pages exist, the whole process from 210 to 250 is repeated until the whole stack of documents has been exhausted, and all the pages have been classified and appended to the appropriate document.

In some alternate example embodiments, multiple bookmarks corresponding to first pages of multiple documents may be temporarily maintained until all page images have been classified, after which individual electronic documents are created for each bookmark and the page images appended to each respective bookmark.

When all of the pages have been scanned and the stack has been separated into the appropriate electronic documents, the electronic documents may be transmitted or sent over network 110 to computer 105 or another repository or database for storage. In some example aspects, the electronic documents may be sent to another application for further processing, such as e-mailing, prior to storage. In some other example aspects, the electronic documents may be stored locally in imaging device 103.

Figure 3:
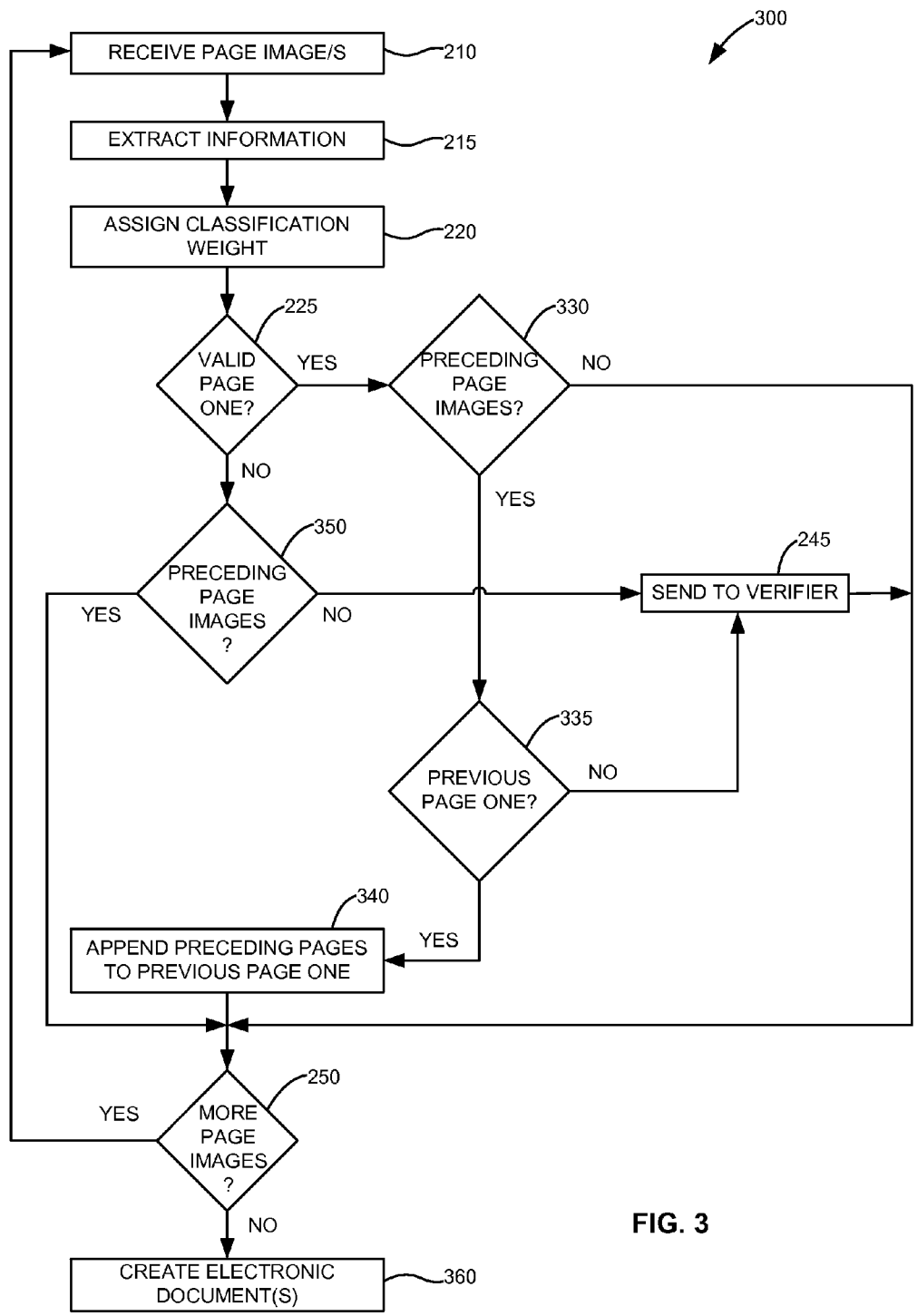
FIG. 3 shows a second example method of classifying scanned images and automatically appending the classified page images to an appropriate document.

FIG. 3 shows a second example method 300 of classifying scanned images and automatically appending the classified page images to an appropriate document. Unlike example method 200, example method 300 does not make use of bookmarks.

The actions performed in Blocks 210 to 225, and 245 to 250 of example method 300 are the same actions preformed in example method 200. At block 210, a page image from a scan job is received by imaging device 103. The page image may be part of a stack of documents such as, for example, a stack of assorted banking and financial forms filled out or completed by a customer and/or banking representative. The scanning may be done manually on a page by page basis or automatically via media feed system 135.

At block 215, information is extracted from the scanned page. The extraction may be accomplished by any number of methods known in the art, such as OCR or OMR. For example, in the case of completed banking forms, the extracted information may include client details such as names, addresses, and other contact information. The information extracted may be used in and for one or more processes, such as classifying the page image, identifying or categorizing the document, or storing the document in a database.

At block 220, a classification weight is assigned to the page image. The classification weight is a value assigned to a page image based on the information extracted at block 315. The classification weight may be based upon the likelihood or probability that the received page image is a first page of a document and calculated based upon the extracted information, the layout and/or the phrasing of the extracted information. The classification weight assigned to a page allows the application to determine the document to which the page belongs. The classification weights may be defined by the application performing method 300 or another assigning application communicatively connected to the application performing method 300.

At block 225, the likelihood of the page image being a first page is determined. The determination may be done by comparing the classification weight assigned at block 220 with the classification weights of the sample set provided. In the event that there is no exact match, the distance between candidate document types may be determined, and the page image may be classified as the document type to which the assigned classification weight is closest.

At block 330, after determining that the page image being processed is a first page at block 325, it is determined if there are page images that have been classified prior the current page image. If there are no prior pages, the presence of other page images to be classified is determined at block 250.

At block 335, if it is determined at block 330 that there are preceding page images, it is determined whether there is a previously identified first page. Upon a positive determination that a previously identified first page exists, the preceding page images are appended to the previously identified first page at block 340. In some alternate example embodiments, an electronic document may be created that includes all the page images preceding the current page image. Upon a negative determination, the preceding pages are sent to the verifier at block 345.

At block 340, the preceding page images are appended to a previously identified first page in preparation to creating an electronic document at block 360.

At block 350, if the page image being processed is not a first page at block 325, it is determined whether classified page images preceding the current page image exist. Upon a positive determination, the presence of other page images to be processed is determined at block 355. Upon a negative determination, the page image is sent to the verifier at block 345.

At block 245, page images that have been determined to have no previously identified first page at block 335 and page images that have been determined to have no preceding page images at block 350 are sent to the verifier, which will identify, select and/or determine the proper classification of or the placement for the page image within the stack. In some example embodiments, the verifier may be part of the application performing method 300. In other example embodiments, the verifier may be another application that determines the placement of the page imager within the stack. In yet other example embodiments, the verifier may be a user who manually determines the placement of the scanned page by viewing the page image either on user interface 120 on imaging device 103 or a display monitor of computer 105. In some example embodiments, the verifier may be another application that determines the placement of the scanned page within the stack. In other example embodiments, the verifier may be a user who manually determines the placement of the scanned page by viewing the page image on user interface 120 of imaging device 103 or a display monitor of computer 105.

At block 250, after determining that there are no preceding page images at block 330, appending preceding images to a previous first page at block 340, or sending page images to the verifier, the presence of other page images to be classified is determined. If it is determined that there are still page images to be classified, blocks 210 to 355 are repeated until the whole stack of documents has been exhausted, and all the pages have been classified and appended to the appropriate documents.

At block 360, after it has been determined at block 250 that there are no more page images to be processed, electronic documents are created for all the identified first pages. The electronic document includes the identified first pages as well as all page images subsequently appended to it. In some alternate embodiments, an electronic document may be created each time a first page is identified. In such an alternate embodiment, the electronic document includes all the page images preceding the current first page. The format of the electronic documents may be preset or predefined, by the manufacturer of the application, an administrator of system 100 or by a user. In some alternate embodiments, the format of the electronic documents may be selected during initial startup or as each electronic document is created. The created documents may now be sent to a storage or database, sent via e-mail, or any other use.

Figure 4:
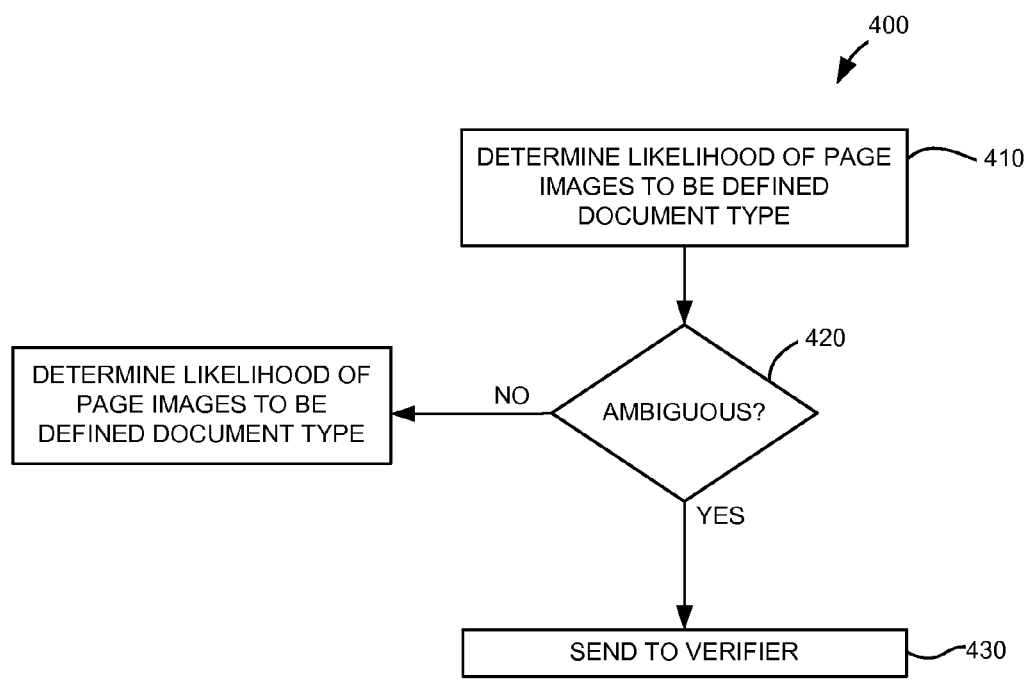
FIG. 4 shows an example sub-process 400 that may be performed during the execution of the example methods of FIG. 2 or 3.

FIG. 4 shows one example method 400 that may be used as part of determining the likelihood the page image is a first page (block 225 in example method 200 or example method 300). Example method 400 may also be used in determining the likelihood of the page image being a particular document type to the extent necessary or desired to determine the page image classification.

At block 410, the likelihood of the page image being or belonging to a particular document type is determined. The determination may be done by comparing the classification weight assigned at block 220 (in example method 200 or 300) with the classification weights of the sample set provided. In the event that there is no exact match, the distance between candidate document types may be determined, and the page image may be classified as the document type to which the assigned classification weight is closest.

At block 420, it is determined whether the classification weight is sufficient to classify the page image as a certain document type, that is, whether the classification weight is substantially closer to the classification weight of one document type as compared to the classification weights of other document types. If the classification weight is sufficient to classify the page image as a certain document type (i.e., a positive classification), the page image is identified as having the corresponding the document type classification.

However, upon a negative determination at block 420, i.e., if the likelihood of a page image is substantially close to at least two document types, the page image is immediately sent to a verifier at block 430. For example, if a likelihood of a page image being a Type X document is 87% and the likelihood of the same page image being a Type Y document is 88%, it is an ambiguous page image. The ambiguous page image may then be immediately sent to a verifier at block 430. Substantially close occurs when the likelihood percentage meets or exceeds a certain threshold as identified or determined by the software manufacturer, a distributor, a software reseller, a customer, an application or system administrator, or an end user.

Similar to the verifier at block 245 in example methods 200 and 300, the verifier at block 430 will identify, select and/or determine the proper classification of the document type. In some example embodiments, the verifier may be the same as or different from the application that determines the placement of the scanned page within the stack. In other example embodiments, the verifier may be the same or a different user from the user who manually determines the placement of the scanned page by viewing the page image on user interface 120 of imaging device 103 or a display monitor of computer 105.

Figure 5:
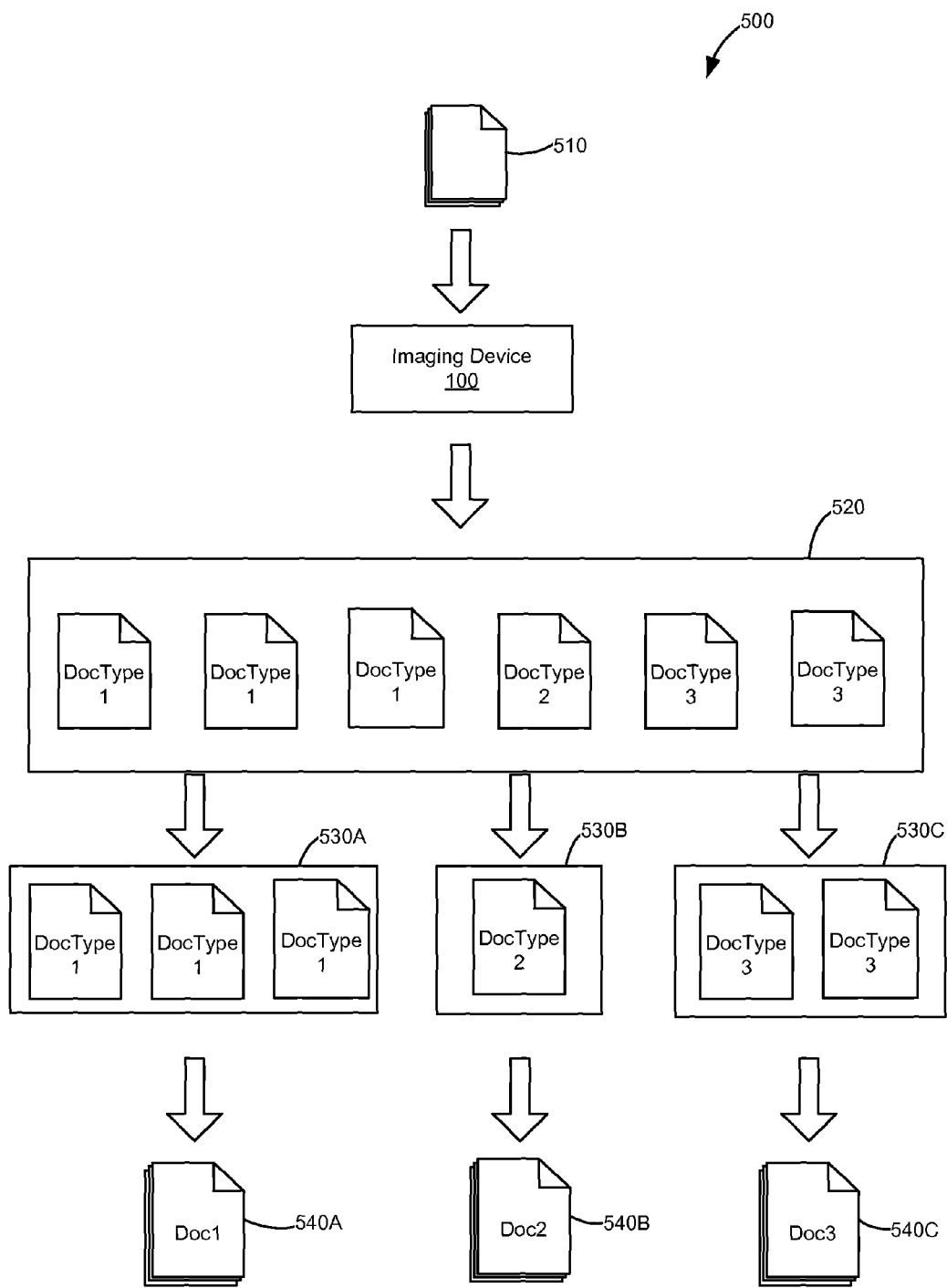
FIG. 5 shows an example output diagram for a stack of documents separated using the example methods of FIG. 2 or 3.

FIG. 5 shows an example output diagram 500 for a stack of documents 500 separated using example method 200 of FIG. 2 or example method 300 of FIG. 3. Each page of stack of documents 510 is scanned at an imaging device 103. Each image of each scanned page image is classified according to the actions in blocks 210 to 225 of example method 200 or example method 300. For example, in FIG. 5, the page images 520 of the stack 510 have been analyzed and classified as belonging to three separate documents 540A, 540B and 540C.

The classified page images 520 are then appended to their respective identified first pages. For example, a first document 530A may have a first page and two other pages appended to the first page; a second document 530B may only have a first page and no appended pages; and a third document 530C may have a first page and another page appended to the first page.

Once the page images have been separated and appended to their respective first pages, electronic documents 540A, 540B and 540C are created. Each electronic document includes the identified first page as well as all page images subsequently appended to it. For example, in FIG. 5, the three documents that have been created are 540A, 540B and 540C. Documents 540A, 540B and 540C may then be further processed by the application or transmitted to another application or server for further processing, such as e-mail. In some example aspects, documents 540A, 540B and 540C may be sent to a remote storage repository, such as a database storage, in addition to or in lieu of being sent for further processing. For example, electronic documents 540A, 540B and 540C may be transmitted or sent over network 110 to computer 105 or another repository or database for further processing and/or storage. In some other example aspects, the electronic documents may be stored locally in imaging device 103.

In some example embodiments, documents 540A, 540B and 540C may be of a specific format, depending upon the process or workflow in which it will be sent and/or where it will be stored. For example, document 540A and 540B may be in a searchable format and may be stored in a database while document 540C may be in an image format that can be easily sent through email.

It will be appreciated that the actions described and shown in the example flowcharts may be carried out or performed in any suitable order. It will also be appreciated that not all of the actions described in FIG. 2, FIG. 3, and FIG. 4 need to be performed in accordance with the example embodiments of the disclosure and/or additional actions may be performed in accordance with other embodiments of the disclosure.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A method of processing a plurality of page images belonging to a plurality of documents so as to separate, without the use of separator sheets, the page images into individual ones of the plurality of documents, the method comprising:
  receiving the plurality of page images from a scanner;
  extracting content from each of the plurality of page images;
  for each of the plurality of page images, determining, based upon the extracted content, whether the respective page image is an initial page image of one of the plurality of documents, wherein the determining comprises:
    assigning a classification weight to each of the plurality of page images based upon an analysis of the extracted content, wherein each classification weight reflects a discrete probability that the respective page image is one of the initial pages of one or more of the plurality of documents; and
    determining, based upon a comparison of the assigned classification weight to a sample set of classification weights, whether the page image is an initial page of a document in the plurality of documents;
    wherein the comparison comprises calculating a percentage probability of whether the page is an initial page of one of the plurality of documents according to a formula:

$$(1-((W_{type\ X}-W_{Assigned})/W_{type\ X}));$$

wherein $W_{type\ X}$ is a classification weight of a page of a document of a particular type in a sample set of documents; and
    wherein $W_{assigned}$ is the classification weight assigned to the page image; and
  appending each of the plurality of page images located between a first determined initial page image of the one of the plurality of documents and a subsequent, second determined initial page image of another of the plurality of documents to the first determined initial page image.

2. The method of claim 1, wherein the determining is further based on a layout of the page image;
  wherein the appending is performed after the determining a first determined initial page image and a subsequent second determined initial page image; and
  wherein the determining and the appending are performed by an application communicatively coupled to the scanner over a network.

3. The method of claim 1, further comprising identifying the determined initial page images as bookmarks one at a time, wherein the identifying comprises:
  upon determining a subsequent initial page image, moving a bookmark identifying a previously determined initial page image from the previously determined initial page image to the subsequent initial page image; and
  creating an electronic document comprising the previously determined initial page image and all page images between the previously determined initial page image and the subsequent initial page image to which the bookmark was moved.

4. The method of claim 1, wherein the appending is performed automatically without user intervention.

5. The method of claim 1, further comprising creating an electronic document for each determined initial page image and the plurality of page images appended thereto; and
  wherein the creating the electronic document is performed after all of the plurality of pages images are received from the scanner.

6. The method of claim 5, further comprising transmitting the electronic document over a network for additional processing.

7. The method of claim 5, further comprising storing the electronic document; and
  wherein the plurality of page images consist of page images belonging to the plurality of documents.

8. A method of categorizing a plurality of scanned pages without the use of separator pages, the method comprising:
  extracting content from each of the plurality of scanned pages;
  assigning, based upon the extracted content, a classification weight to each of the plurality of scanned pages;
  determining for each of the plurality of scanned pages if, based upon the assigned classification weight, the scanned page is an initial page of a document, wherein the determining comprises:
    assigning a classification weight to each of the plurality of scanned pages based upon an analysis of the extracted content, wherein each classification weight reflects a discrete probability that the respective scanned page is the initial page of the document; and
    determining, based upon a comparison of the assigned classification weight to a sample set of classification weights, whether the scanned page is the initial page of a the document;
    wherein the comparison comprises calculating a percentage probability of whether the scanned page is the initial page of the document according to a formula:

$$(1-((W_{type\ X}-W_{Assigned})/W_{type\ X}));$$

wherein $W_{type\ X}$ is a classification weight of a page of a document of a particular type in a sample set of documents; and
  wherein $W_{assigned}$ is the classification weight assigned to the scanned page;
  after determining two subsequent initial pages of two subsequent documents in the plurality of scanned pages, appending the scanned pages between the two subsequently determined initial pages to a first determined initial page; and
  creating an electronic file for each determined initial page and the scanned pages appended thereto.

9. The method of claim 8, wherein the comparison further comprises:
  identifying the scanned page as an initial page of a document if the assigned classification weight matches a classification weight for an initial page in the sample set; and
  wherein the assigned classification weight matches a classification weight for an initial page in the sample set if a likelihood percentage that the scanned page is an initial page exceeds a predetermined threshold.

10. The method of claim 8, further comprising determining, based upon comparing the assigned classification weight to a plurality of classification weights each corresponding to a different document type represented in a training set, a document type of each scanned page.

11. A method of categorizing a scanned page without the use of separator pages, comprising:
  extracting content from the scanned page;
  assigning, based upon the extracted content and a layout of the scanned page, a classification weight to the scanned page;

determining, based upon the assigned classification weight, if the scanned page is an initial page of a first document, wherein the determining comprises:
    assigning a classification weight to the scanned page based upon an analysis of the extracted content, wherein the classification weight reflects a discrete probability that the scanned page is one of the initial pages of the first document; and
    determining, based upon a comparison of the assigned classification weight to a sample set of classification weights, whether the scanned is an initial page of the first document;
    wherein the comparison comprises calculating a percentage probability of whether the scanned page is an initial page of the first document according to a formula:

$$(1-((W_{type\ X}-W_{Assigned})/W_{type\ X}));$$

wherein $W_{type\ X}$ is a classification weight of a page of a document of a particular type in a sample set of documents; and
    wherein $W_{assigned}$ is the classification weight assigned to the scanned page; and
    if the scanned page determined to be an initial page of a first document, designating the scanned page as the initial page of the first document;
    appending at least one subsequently scanned page to the initial page of the first document after an initial page of a second document is determined; and
    creating an electronic file, the electronic file including the initial page of the first document and the at least one subsequently scanned page appended thereto.

12. The method of claim 11, further comprising determining, based upon the assigned classification weight, a document type of the scanned page.

13. A non-transitory computer readable storage medium storing one or more instructions that, when executed by a computer, cause the computer to perform a method of processing a plurality of page images to separate the plurality of page images into a plurality of documents without the use of separator pages, the method comprising:
    receiving the plurality of page images from a scanner;
    extracting content from each of the plurality of page images;
    for each of the plurality of page images, determining, based upon the extracted content, whether the respective page image is an initial page image of one of the plurality of documents wherein the determining comprises:
        assigning a classification weight to each of the plurality of page images based upon an analysis of the extracted content, wherein each classification weight reflects a discrete probability that the respective page image is one of the initial pages of one or more of the plurality of documents; and
        determining, based upon a comparison of the assigned classification weight to a sample set of classification weights, whether the page image is an initial page of a document in the plurality of documents;
        wherein the comparison comprises calculating a percentage probability of whether the page is an initial page of one of the plurality of documents according to a formula:

$$(1-((W_{type\ X}-W_{Assigned})/W_{type\ X}));$$

wherein $W_{type\ X}$ is a classification weight of a page of a document of a particular type in a sample set of documents; and
        wherein $W_{assigned}$ is the classification weight assigned to the page image; and
    appending each of the plurality of page images located between a first determined initial page image of the one of the plurality of documents and a subsequent, second determined initial page image of another of the plurality of documents to the first determined initial page image.

14. The non-transitory computer readable storage medium of claim 13, wherein the determining comprises:
    assigning a classification weight to each of the plurality of page images based upon an analysis of:
        the extracted content;
        a layout of each of the plurality of page images; and
        a phrasing of each of the plurality of page images; and
    determining, based upon a comparison of the assigned classification weight to a sample set of classification weights, whether the page image is an initial page of a document in the plurality of documents.

15. The non-transitory computer readable storage medium of claim 13, wherein the method further comprises identifying the determined initial page images as bookmarks; and
    creating an electronic document for each determined initial page image and the plurality of page image images appended thereto.

16. The non-transitory computer readable storage medium of claim 13, wherein the appending is performed automatically without user intervention.

17. The method of claim 1, comprising:
    assigning a classification weight to each of the plurality of page images based at least in part on an analysis of content extracted from each respective one of the plurality of page images;
    determining, based upon a comparison of each assigned classification weight to a set of classification weights corresponding to different types of documents in a sample set, a document type of each of the plurality of page images;
    in response to determining one of the plurality of page images is a particular type of document corresponding to one of the types of documents in the sample set, assigning a second classification weight to each of the plurality of page images based at least in part on an analysis of content extracted from each respective one of the plurality of page images; and
    determining, based upon a comparison of the assigned second classification weight to a set of classification weights corresponding to different pages of the particular type of document, whether the one of the plurality of page images is an initial page of the particular type of document.

18. The method of claim 1, wherein, in response to determining one of the plurality of page images is not an initial page image of one of the plurality of documents, determining whether a bookmarked page image exists within the plurality of images; and either
    in response to determining the bookmarked page image exists within the plurality of page images, appending the one of the plurality of page images to the bookmarked page image; or
    in response to determining the bookmarked page image does not exist within the plurality of page images, sending the one of the plurality of page images to a verifier to determine a proper classification and/or placement of the one of the plurality of page images within the plurality of documents.

* * * * *